US012728611B2

(12) United States Patent
Takemoto et al.

(10) Patent No.: US 12,728,611 B2
(45) Date of Patent: Sep. 8, 2026

(54) DEFECT DETECTING DEVICE AND DEFECT DETECTING METHOD FOR CORRUGATED CARDBOARD SHEET, AND BOX MAKING MACHINERY

(71) Applicant: MITSUBISHI HEAVY INDUSTRIES MACHINERY SYSTEMS, LTD., Hyogo (JP)

(72) Inventors: Shuichi Takemoto, Hyogo (JP); Mitsuhiro Nadachi, Hyogo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 130 days.

(21) Appl. No.: 18/683,266

(22) PCT Filed: Aug. 21, 2023

(86) PCT No.: PCT/JP2023/029999
§ 371 (c)(1),
(2) Date: Feb. 13, 2024

(87) PCT Pub. No.: WO2024/053377
PCT Pub. Date: Mar. 14, 2024

(65) Prior Publication Data

US 2025/0135741 A1 May 1, 2025

(30) Foreign Application Priority Data

Sep. 8, 2022 (JP) ................................ 2022-143066

(51) Int. Cl.
*B31B 50/00* (2017.01)
*B31B 50/25* (2017.01)
(Continued)

(52) U.S. Cl.
CPC ........... *B31B 50/006* (2017.08); *B31B 50/25* (2017.08); *B31B 2100/002* (2017.08); *B31B 2110/35* (2017.08); *G01N 2021/845* (2013.01)

(58) Field of Classification Search
CPC . B31B 50/006; B31B 50/25; B31B 2100/002; B31B 2110/35;
(Continued)

(56) References Cited

U.S. PATENT DOCUMENTS

2003/0137667 A1 7/2003 Reis et al.
2009/0091761 A1 4/2009 Kraus et al.

FOREIGN PATENT DOCUMENTS

JP S6072513 U1 5/1985
JP 2017203660 A 11/2017
JP 2021115839 A * 8/2021

OTHER PUBLICATIONS

International Search Report and Written Opinion of International Application No. PCT/JP2023/029999 mailed Oct. 3, 2023; 15pp.

* cited by examiner

*Primary Examiner* — Georgia Y Epps
*Assistant Examiner* — Erin R Garber
(74) *Attorney, Agent, or Firm* — HAUPTMAN HAM, LLP

(57) ABSTRACT

A defect detecting device is provided for a corrugated cardboard sheet having one surface formed with a recessed portion of a first score in a thickness direction and another surface formed with a recessed portion of a second score having a smaller depth in the thickness direction. The device includes: a measurement device configured to measure a distance from an arrangement position to a front end of the sheet and a distance from the arrangement position to the recessed portion of the first score or the second score to acquire a measured distance; and a determination device
(Continued)

configured to perform comparison of the measured distance with a threshold value in a determination region that is predetermined and preset from the front end toward a back end of the corrugated cardboard sheet to determine a front/rear surface defect or a front/back side defect of the sheet.

10 Claims, 12 Drawing Sheets

(51) Int. Cl.
*B31B 100/00* (2017.01)
*B31B 110/35* (2017.01)
*G01N 21/84* (2006.01)

(58) Field of Classification Search
CPC . B31B 2120/302; B31B 50/04; B31B 50/044; B31B 50/046; B31B 50/02; G01N 2021/8416; G01N 2021/845; G01N 2021/8455; G01N 2021/8917; B65H 2701/176; G01S 5/14; G01S 5/30
See application file for complete search history.

DEFECT DETECTING DEVICE AND DEFECT DETECTING METHOD FOR CORRUGATED CARDBOARD SHEET, AND BOX MAKING MACHINERY

RELATED APPLICATIONS

The present application is a National Phase of International Application Number PCT/JP2023/029999 filed Aug. 21, 2023, and claims priority of Japanese Application Number 2022-143066 filed Sep. 8, 2022.

TECHNICAL FIELD

The present disclosure relates to a defect detecting device and a defect detecting method for a corrugated cardboard sheet and box making machinery that determine a defect in an orientation of the corrugated cardboard sheet in a conveying state.

BACKGROUND ART

A manufacturing device for a corrugated cardboard sheet processes a medium in a corrugated shape, bonds a rear liner to the medium to form a single-faced corrugated cardboard sheet, and bonds a front liner to the single-faced corrugated cardboard sheet to form a double-faced corrugated cardboard sheet. The double-faced corrugated cardboard sheet is cut in a predetermined width and a predetermined length to obtain a corrugated cardboard sheet having a plate shape. In addition, the manufacturing device for the corrugated cardboard sheet forms scores for forming flaps in the corrugated cardboard sheet at the last stage.

Box making machinery manufactures a box body (corrugated cardboard box) by processing a corrugated cardboard sheet manufactured by the manufacturing device for the corrugated cardboard sheet. That is, the box making machinery performs printing on a surface of the corrugated cardboard sheet to form creases serving as folding lines, and also performs processing for forming grooves, which form flaps, paste margins for joining, and the like. The corrugated cardboard sheet in which the scores and creases, the grooves, and the like are formed is folded after paste is applied to the paste margins to form a corrugated cardboard box in a flat shape.

The manufacturing device for the corrugated cardboard sheet manufactures the corrugated cardboard sheet by bonding the rear liner, the medium having the corrugated shape, and the front liner in layers. At this time, the corrugated cardboard sheet is conveyed in a state in which the rear liner is positioned on an upper surface side. On the other hand, the box making machinery is conveyed in a state where the front liner is positioned on the upper surface side, and manufactures the corrugated cardboard box in the flat shape. For the manufacturing device for the corrugated cardboard sheet and the box making machinery, conveying directions of the corrugated cardboard sheet are different from each other by 90 degrees in a horizontal direction. Further, for the manufacturing device for the corrugated cardboard sheet and the box making machinery, the front surface and the rear surface of the corrugated board sheet are reversed in conveying. Thus, the corrugated cardboard sheet manufactured by the manufacturing device for the corrugated cardboard sheet is supplied to the box making machinery after the conveying direction of the corrugated cardboard sheet is changed and the front and rear surfaces of the corrugated cardboard sheet are reversed.

Due to this, when the corrugated cardboard sheet is supplied to the box making machinery, the conveying direction and the front and rear surfaces are not appropriately changed in some cases. For example, front and back sides of the corrugated cardboard sheet in the conveying direction may be reversed, or the front and rear surfaces of the corrugated cardboard sheet may be reversed. Examples of a technique for detecting a defect of an orientation of the corrugated cardboard sheet in the conveying direction include a technique described in the following Patent Literature 1.

CITATION LIST

Patent Literature

Patent Literature 1: JP 2021-115839 A

SUMMARY OF INVENTION

Technical Problem

In the method for detecting occurrence of a defective product described in Patent Literature 1, a front end of a corrugated cardboard sheet and a recessed portion of a score are detected, a conveyance time from detection of the front end of the corrugated cardboard sheet to detection of the recessed portion of the score is converted into a distance between the front end of the corrugated cardboard sheet and the recessed portion of the score, and whether or not the recessed portion of the score is at an appropriate position is determined. However, the conventional method for detecting occurrence of a defective product has a problem that although a defect related to the front and back sides of the corrugated cardboard sheet in the conveying direction can be detected, a defect in which the front and rear surfaces of the corrugated cardboard sheet are reversed cannot be detected.

The present disclosure has been made to solve the above-described problem, and an object of the present disclosure is to provide a defect detecting device and a defect detecting method for a corrugated cardboard sheet and box making machinery that can appropriately detect a defect of a corrugated cardboard sheet in a conveying state.

Solution to Problem

A defect detecting device for a corrugated cardboard sheet according to an aspect of the present disclosure to achieve the above-described object is a defect detecting device for a corrugated cardboard sheet, the corrugated cardboard sheet including one surface formed with a recessed portion of a first score in a thickness direction, and another surface formed with a recessed portion of a second score in the thickness direction, the recessed portion of the second score having a depth smaller than a depth of the recessed portion of the first score, the defect detecting device including a measurement device disposed opposing the one surface or the other surface and being configured to measure a distance from an arrangement position to a front end of the corrugated cardboard sheet and a distance from the arrangement position to the recessed portion of the first score or the recessed portion of the second score to acquire a measured distance, a storage device configured to store a threshold value that is preset, and a determination device configured to perform comparison of the measured distance with the threshold value in a determination region that is predetermined and preset from the front end toward a back end of the corrugated cardboard sheet, specify a magnitude relationship between the measured distance and the threshold value by the comparison, and determine a front/rear surface defect of the corrugated cardboard sheet or a front/back side defect of the corrugated cardboard sheet by using the magnitude relationship.

Further, a defect detecting method for a corrugated cardboard sheet according to another aspect of the present disclosure is a defect detecting method for a corrugated cardboard sheet, the corrugated cardboard sheet including one surface formed with a recessed portion of a first score in a thickness direction, and another surface formed with a recessed portion of a second score in the thickness direction, the recessed portion of the second score having a depth smaller than a depth of the recessed portion of the first score, the defect detecting method including measuring a distance from a predetermined position opposing the one surface or the other surface to a front end of the corrugated cardboard sheet and a distance from the predetermined position to the recessed portion of the first score or the recessed portion of the second score to acquire a measured distance, comparing the measured distance with a threshold value that is preset in a determination region that is predetermined and preset from the front end toward a back end of the corrugated cardboard sheet, and specifying a magnitude relationship between the measured distance and the threshold value and determining a front/rear surface defect of the corrugated cardboard sheet or a front/back side defect of the corrugated cardboard sheet by using the magnitude relationship.

Further, box making machinery according to another aspect of the present disclosure includes the defect detecting device for the corrugated cardboard sheet.

Advantageous Effects of Invention

According to the defect detecting device and the defect detecting method for the corrugated cardboard sheet, and the box making machinery according to the present disclosure, a defect of the corrugated cardboard sheet in a conveying state can be appropriately detected.

DESCRIPTION OF EMBODIMENTS

Hereinafter, preferred embodiments of the present disclosure will be described in detail with reference to the drawings. Note that the present disclosure is not limited to these embodiments, and when there is a plurality of embodiments, the present disclosure is intended to include a configuration combining these embodiments. In addition, components in the embodiments include those that can be easily assumed by those skilled in the art, those that are substantially the same, and those with a so-called equivalent scope.

First Embodiment

Corrugating Machine

Figure 1:
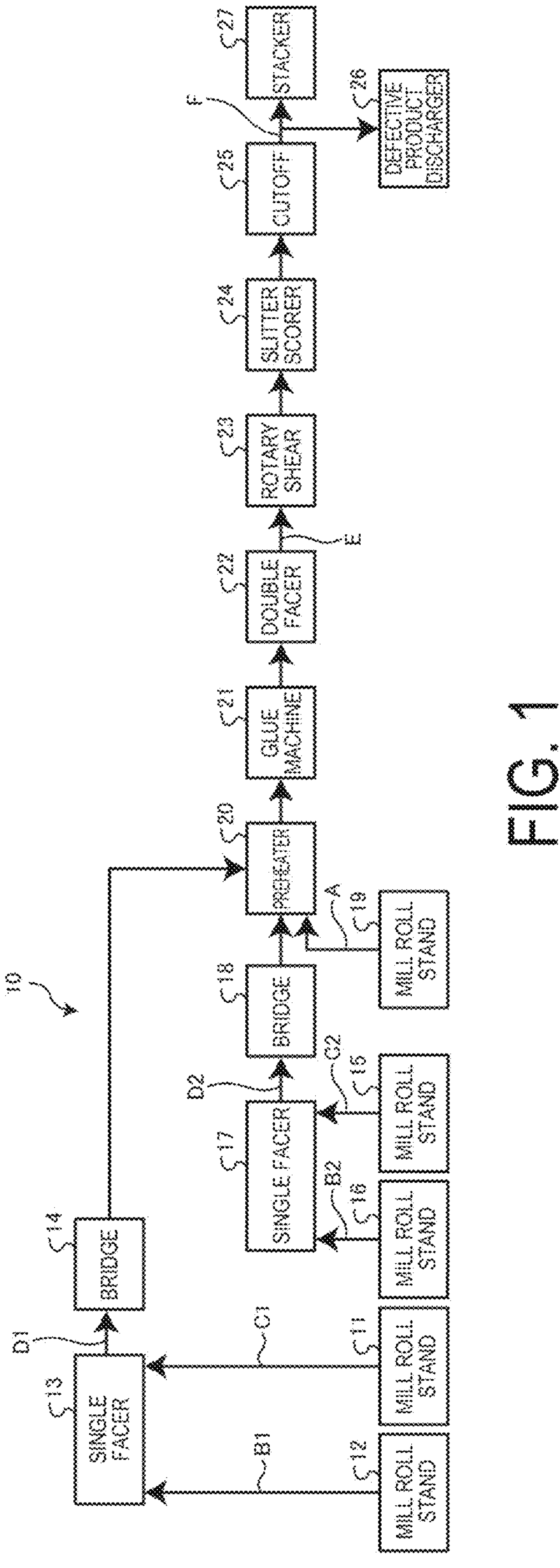
FIG. 1 is a schematic diagram illustrating a corrugating machine.

FIG. 1 is a schematic diagram illustrating a corrugating machine.

As illustrated in FIG. 1, a corrugating machine (a manufacturing device for a corrugated cardboard sheet) 10 includes mill roll stands 11 and 12, a single facer 13, a bridge 14, mill roll stands 15 and 16, a single facer 17, a bridge 18, a mill roll stand 19, a preheater 20, a glue machine 21, a double facer 22, a rotary shear 23, a slitter scorer 24, a cutoff 25, a defective product discharger 26, and a stacker 27.

The mill roll stand 11 holds roll paper in which a medium C1 is wound in a roll shape, and continuously supplies the medium C1 by rotating the roll paper. The mill roll stand 12 holds roll paper in which a rear liner B1 is wound in a roll shape, and continuously supplies the rear liner B1 by rotating the roll paper. The single facer 13 processes the medium C1 into a corrugated shape, and bonds the medium C1 to the rear liner B1 to form a single-faced corrugated cardboard sheet D1. The bridge 14 primarily retains the single-faced corrugated cardboard sheet D1 to absorb a difference in speed between the single facer 13 and the double facer 22.

The mill roll stand 15 holds roll paper in which a medium C2 is wound in a roll shape, and continuously supplies the medium C2 by rotating the roll paper. The mill roll stand 16 holds roll paper in which a rear liner B2 is wound in a roll shape, and continuously supplies the rear liner B2 by rotating the roll paper. The single facer 17 processes the medium C2 into a corrugated shape, and bonds the medium C2 to the rear liner B2 to form a single-faced corrugated cardboard sheet D2. The bridge 18 primarily retains the single-faced corrugated cardboard sheet D2 to absorb a difference in speed between the single facer 17 and the double facer 22.

The mill roll stand 19 holds roll paper in which a front liner A is wound in a roll shape, and continuously supplies the front liner A by rotating the roll paper. The preheater 20 preheats each of the single-faced corrugated cardboard sheet D1, the single-faced corrugated cardboard sheet D2, and the front liner A. The glue machine 21 applies paste to top portions of the mediums C1 and C2 in the single-faced corrugated cardboard sheets D1 and D2. The double facer 22 forms a continuous double wall corrugated cardboard sheet E by bonding the single-faced corrugated cardboard sheet D1, the single-faced corrugated cardboard sheet D2, and the front liner A together while overlapping, pressing, and heating the single-faced corrugated cardboard sheet D1, the single-faced corrugated cardboard sheet D2, and the front liner A.

The rotary shear 23 fully or partially cuts the double wall corrugated cardboard sheet E in a width direction before the bonding is stabilized at an initial stage of operation. The slitter scorer 24 cuts the double wall corrugated cardboard sheet E along a conveying direction so as to have a predetermined width and processes scores extending in the conveying direction. The cutoff 25 cuts the double wall corrugated cardboard sheet E along the width direction so as to have a predetermined length. A double wall corrugated cardboard sheet F having a plate shape is formed by the slitter scorer 24 and the cutoff 25. The defective product discharger 26 discharges the double wall corrugated cardboard sheet F determined as a defective product from a conveying line. The stacker 27 stacks the double wall corrugated cardboard sheets F determined to be a good product and discharges the stacked double wall corrugated cardboard sheets F as manufactured products.

Note that in the above description, the case where the corrugating machine 10 bonds the single-faced corrugated cardboard sheet D1, the single-faced corrugated cardboard sheet D2, and the front liner A to manufacture the double wall corrugated cardboard sheet F has been described. However, the corrugating machine 10 can also bond the single-faced corrugated cardboard sheet D1 or the single-faced corrugated cardboard sheet D2 and the front liner A to manufacture a double-faced corrugated cardboard sheet. Thus, in the following description, the rear liners B1 and B2 will be referred to as a rear liner B, the mediums C1 and C2 will be referred to as a medium C, and the double wall corrugated cardboard sheet F and the double-faced corrugated cardboard sheet having a plate shape will be referred to as a corrugated cardboard sheet S.

Figure 2:
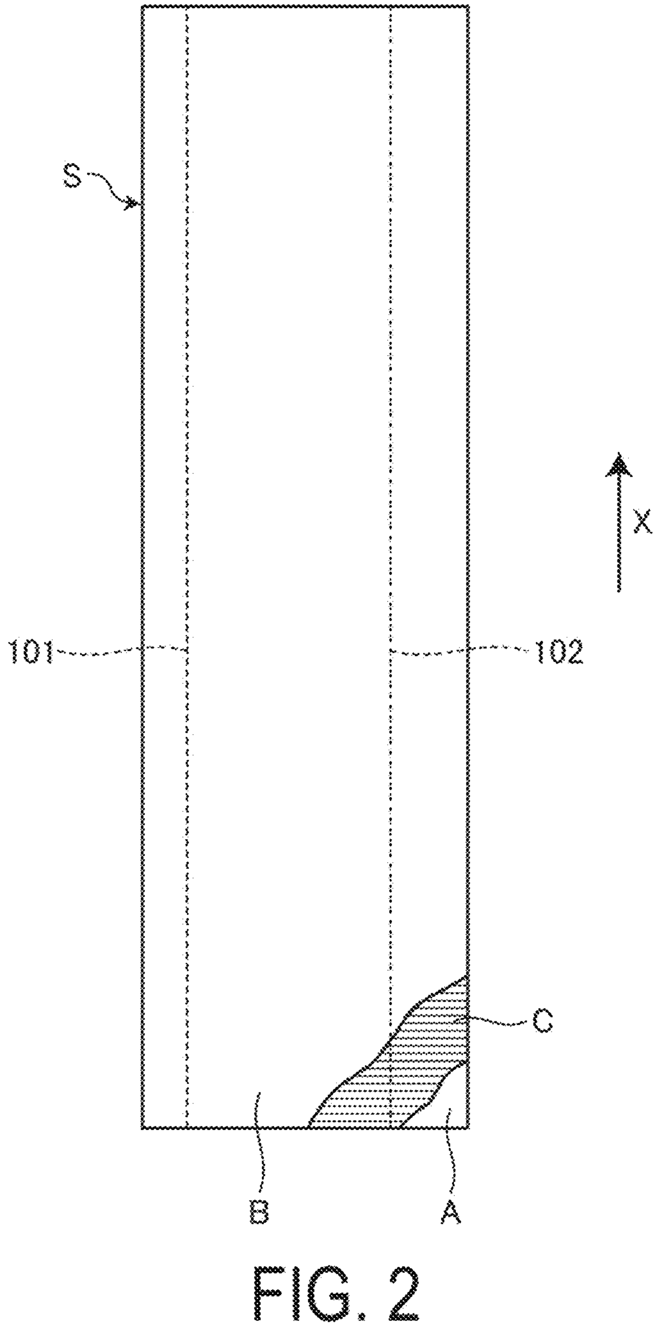
FIG. 2 is a plan view of a corrugated cardboard sheet manufactured by the corrugating machine.

FIG. 2 is a plan view of a corrugated cardboard sheet manufactured by the corrugating machine.

As illustrated in FIG. 2, the corrugated cardboard sheet S having a plate shape is formed by bonding the front liner A and the rear liner B on both sides of the medium C having a corrugated shape in a thickness direction. The corrugating machine 10 conveys the corrugated cardboard sheet S along a conveying direction X. Then, the corrugated cardboard sheet S is conveyed such that the rear liner B is positioned on an upper surface side in a vertical direction and the front liner A is positioned on a lower surface side in the vertical direction. Then, the corrugating machine 10 forms a score 101 and a score 102 on the corrugated cardboard sheet S.

Here, in the corrugated cardboard sheet S, a length from one end (a left end in FIG. 2) to the score 101 is smaller than a length from the other end (a right end in FIG. 2) to the score 102. However, the length from the one end to the score 101 and the length from the other end to the score 102 are different depending on specifications of the corrugated cardboard sheet S. For example, in the corrugated cardboard sheet S, the length from the one end to the score 101 may be larger than the length from the other end to the score 102, or the length from the one end to the score 101 and the length from the other end to the score 102 may be the same.

Box Making Machinery

Figure 3:
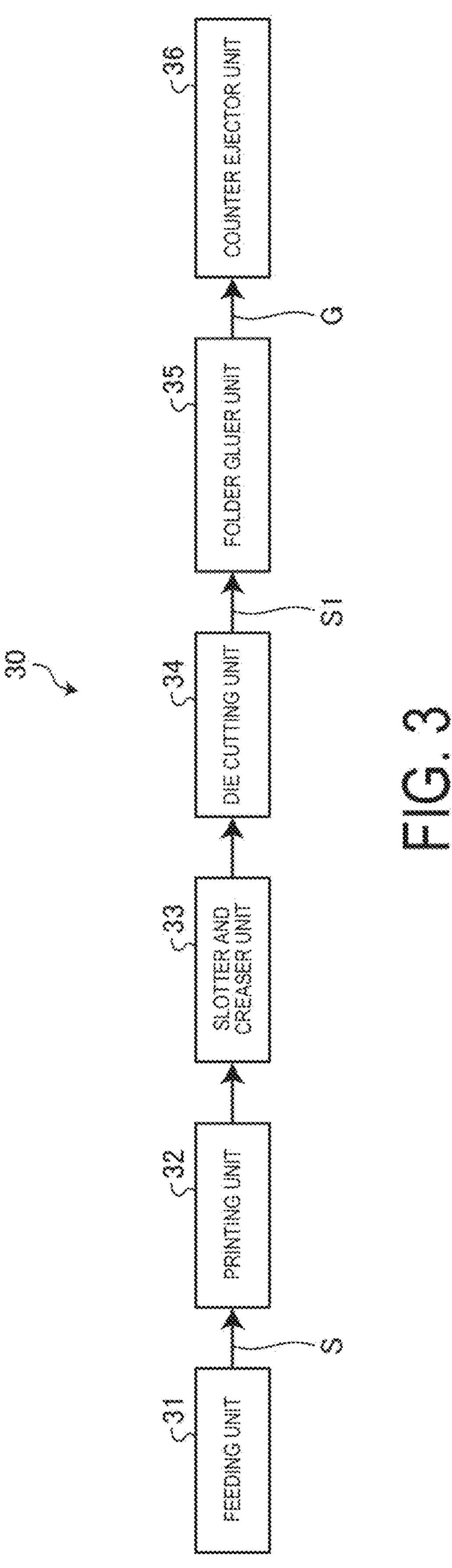
FIG. 3 is a schematic diagram illustrating box making machinery.

FIG. 3 is a schematic diagram illustrating box making machinery.

As illustrated in FIG. 3, box making machinery 30 includes a feeding unit 31, a printing unit 32, a slotter and creaser unit 33, a die cutting unit 34, a folder gluer unit 35, and a counter ejector unit 36.

The feeding unit 31 feeds the corrugated cardboard sheets S one by one at a constant speed along a horizontal direction. The printing unit 32 performs multi-color printing on a surface of the corrugated cardboard sheet S. The slotter and creaser unit 33 has functions of performing a forming operation of creases, performing a cutting operation, and performing a grooving operation, on the corrugated cardboard sheet S. The die cutting unit 34 performs a blanking operation for forming band holes and the like on the corrugated cardboard sheet S to form a corrugated cardboard sheet S1. The folder gluer unit 35 folds the corrugated cardboard sheet S1, joins both end portions of the corrugated cardboard sheet S1 in a width direction, and forms a corrugated cardboard box G having a flat shape. The counter ejector unit 36 stacks the corrugated cardboard boxes G while counting the number of the corrugated cardboard boxes G, groups the corrugated cardboard boxes G into a predetermined number of batches, and then discharges the grouped corrugated cardboard boxes G.

Figure 4:
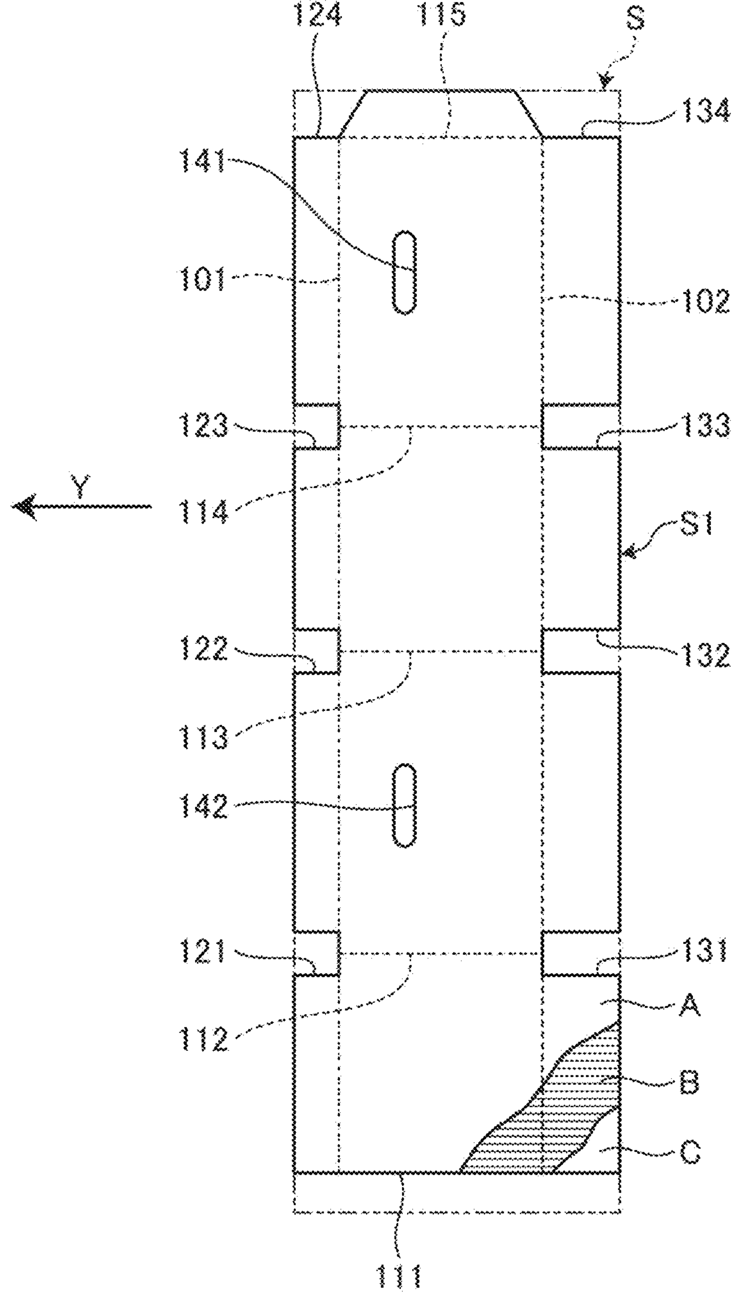
FIG. 4 is a plan view of the corrugated cardboard sheet after being manufactured by the box making machinery and before being folded.

FIG. 4 is a plan view of a corrugated cardboard sheet manufactured by the box making machinery.

Corrugated Cardboard Sheet

FIG. 4 is a plan view of a corrugated cardboard sheet after being manufactured by the box making machinery and before being folded.

As illustrated in FIG. 4, the corrugated cardboard sheet S1 is in a state before being folded and after being subjected to, using the box making machinery 30, a printing operation, a forming operation of creases, a cutting operation, a grooving operation, and a blanking operation on the corrugated cardboard sheet S (indicated by the long-dashed double-dotted line in FIG. 4) manufactured by the corrugating machine 10.

The box making machinery 30 conveys the corrugated cardboard sheet S (S1) along a conveying direction Y. The conveying direction X of the corrugated cardboard sheet S by the corrugating machine 10 and the conveying direction Y of the corrugated cardboard sheet S by the box making machinery 30 are both horizontal directions but are different from each other by 90 degrees in the horizontal direction. In addition, the corrugated cardboard sheet S (S1) is conveyed such that the front liner A is positioned on the upper surface side in the vertical direction and the rear liner B is positioned on the lower surface side in the vertical direction.

The corrugated cardboard sheet S1 is formed with the score 101 and the score 102 by the corrugating machine 10. The score 101 and the score 102 are used to fold flaps when the corrugated cardboard box G manufactured by the box making machinery 30 is assembled.

The corrugated cardboard sheet S1 is formed with a cutting line 111 and creases 112, 113, 114, and 115 at predetermined intervals in a width direction with respect to the conveying direction Y. The corrugated cardboard sheet S1 is formed with grooves 121, 122, and 123 and a notch 124 on the score 101 side at predetermined intervals in the width direction with respect to the conveying direction Y. In addition, the corrugated cardboard sheet S1 is formed with grooves 131, 132, and 133 and a notch 134 on the score 102 side at predetermined intervals in the width direction with respect to the conveying direction Y. Further, the corrugated cardboard sheet S1 is formed with hand holes 141 and 142.

Defect Detecting Device

Figure 5:
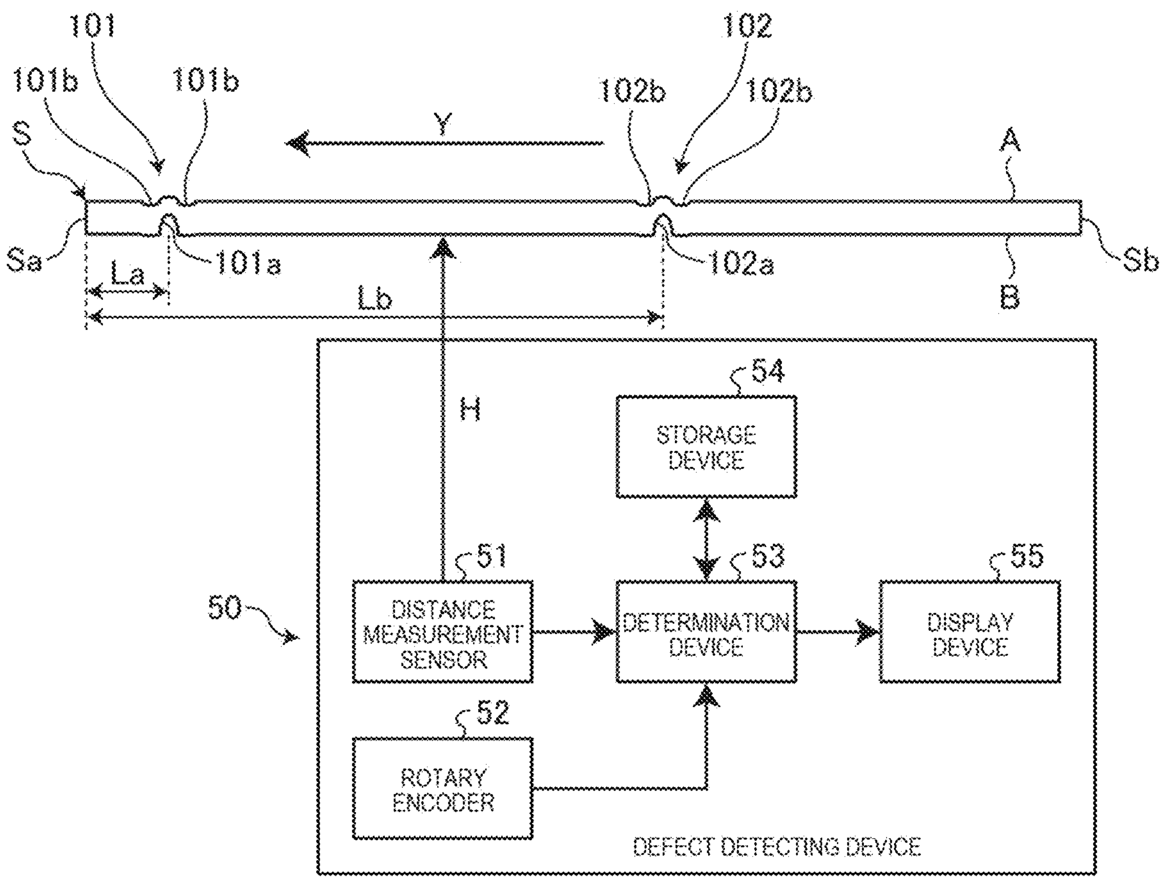
FIG. 5 is a schematic configuration diagram illustrating a defect detecting device for a corrugated cardboard sheet according to a first embodiment.

FIG. 5 is a schematic configuration diagram illustrating a defect detecting device for a corrugated cardboard sheet according to the first embodiment.

As illustrated in FIG. 5, a defect detecting device 50 is disposed upstream in the conveying direction Y of the corrugated cardboard sheet S from the folder gluer unit 35 in the box making machinery 30. The defect detecting device 50 detects a front/rear surface defect and a front/back side defect in the corrugated cardboard sheet S during conveyance. In the corrugated cardboard sheet S, the score 101 is formed downstream in the conveying direction Y, and the score 102 is formed upstream in the conveying direction Y from the score 101. Additionally, in the corrugated cardboard sheet S, a length from a front end Sa to the score 101 is denoted as La, and a length from the front end Sa to the score 102 is denoted as Lb.

With the slitter scorer 24 of the corrugating machine 10, the score 101 of the corrugated cardboard sheet S is formed as a recessed portion by being pinched and crushed by a pair of upper and lower rollers in a thickness direction. One roller has a single ring shape, and the other roller has a double ring shape. The corrugated cardboard sheet S is pressurized by the one roller having the single ring shape and the other roller having the double ring shape, so that one first score 101*a* is formed on one surface of the corrugated cardboard sheet S and two second scores 101*b* are formed on the other surface of the corrugated cardboard sheet S. That is, the corrugated cardboard sheet S is conveyed in a state in which the rear liner B is disposed on the one surface (lower surface) side and the front liner A is disposed on the other surface (upper surface) side, by using the box making machinery 30. Thus, the corrugated cardboard sheet S is formed with the one first score 101*a* in the rear liner B on the lower surface, and is formed with the two second scores 101*b* in the front liner A on the upper surface. The first score 101*a* and each of the second scores 101*b* are positioned in a slightly shifted manner from each other in the conveying direction Y.

Note that the score 101 and the score 102 have the same shape. Thus, also as for the score 102, one first score 102*a* is formed in the rear liner B on the lower surface, and two second scores 102*b* are formed in the front liner A on the upper surface.

The front/rear surface defect of the corrugated cardboard sheet S is a defect in which the corrugated cardboard sheet S is conveyed in a state in which the front surface and the rear surface are reversed. That is, this is a defect in which the corrugated cardboard sheet S is conveyed in a state in which the rear liner B is positioned on the upper surface side and the front liner A is positioned on the lower surface side. In this case, in the corrugated cardboard sheet S, the first scores 101*a* and 102*a* are positioned on the upper surface side, and the second scores 101*b* and 102*b* are positioned on the lower surface side. In addition, the front/back side defect of the corrugated cardboard sheet S is a defect in which the corrugated cardboard sheet S is conveyed in a state in which the front end Sa and a back end Sb of the corrugated cardboard sheet S are reversed. That is, this is a defect in which the corrugated cardboard sheet S is conveyed in a state in which the back end Sb is positioned downstream (on the front end side) and the front end Sa is positioned upstream (on the back end side). In this case, in the corrugated cardboard sheet S, the score 102 is positioned downstream and the score 101 is positioned upstream. Note that for the corrugated cardboard sheet S, the front/rear surface defect and the front/back side defect may occur at the same time.

The defect detecting device 50 includes a distance measurement sensor (measurement device) 51, a rotary encoder 52, a determination device 53, a storage device 54, and a display device 55.

The distance measurement sensor 51 is disposed opposing the rear liner B, which is one surface of the corrugated cardboard sheet S that is being conveyed, at a predetermined distance in the thickness direction of the corrugated cardboard sheet S. The distance measurement sensor 51 measures at least a distance to the front end of the corrugated cardboard sheet S on the downstream side and distances to the recessed portions of the scores 101 and 102 formed in the corrugated cardboard sheet S.

The distance measurement sensor 51 is a distance measurement sensor that is commonly used to measure the distance to the front end of the corrugated cardboard sheet S and the distances to the recessed portions of the scores 101 and 102. However, the distance measurement sensor 51 may include different distance measurement sensors that measure the distance to the front end of the corrugated cardboard sheet S and the distances to the recessed portions of the scores 101 and 102. Here, the recessed portions of the scores 101 and 102 are recessed portions of the first scores 101*a* and 102*a* or recessed portions of the second scores 101*b* and 102*b*. The distance measurement sensor 51 acquires, for example, a maximum distance from the position of the distance measurement sensor 51 to the recessed portions of the first scores 101*a* and 102*a* of the corrugated cardboard sheet S or a maximum distance from the position of the distance measurement sensor 51 to the recessed portions of the second scores 101*b* and 102*b* as a measured distance.

Figure 7:
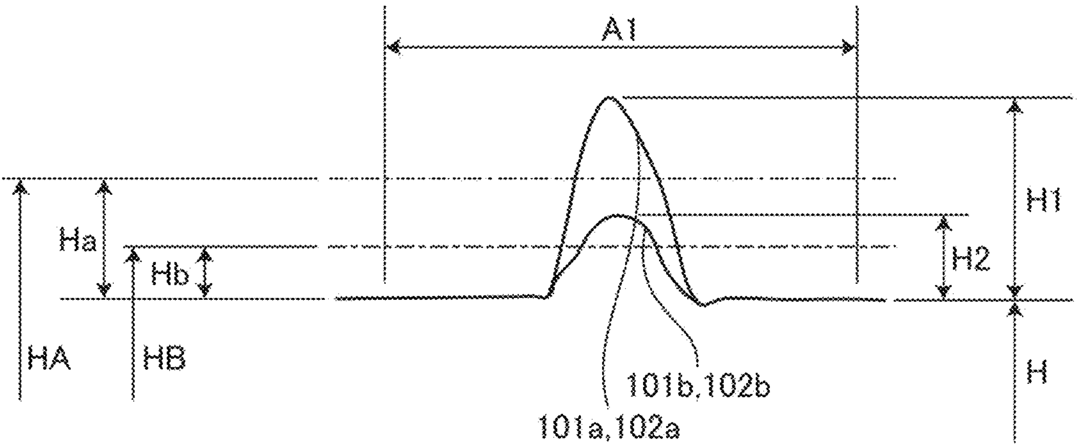
FIG. 7 is an explanatory diagram for describing a first threshold value and a second threshold value.

The distance measurement sensor 51 is disposed on the rear liner B side of the corrugated cardboard sheet S so as to be separated from the rear liner B by a distance H. That is, a distance from the distance measurement sensor 51 to the flat surface of the corrugated cardboard sheet S is the distance H. Thus, when the distance measurement sensor 51 measures the distance H, it means that the distance measurement sensor 51 measures the front end Sa or the back end Sb of the corrugated cardboard sheet S. Further, as illustrated in FIG. 7, which will be described later, a depth of the recessed portions of the first scores 101*a* and 102*a* is a depth H1, and a depth of the recessed portions of the second scores 101*b* and 102*b* is a depth H2. The depth H1 of the first scores 101*a* and 102*a* is larger than the depth H2 of the second scores 101*b* and 102*b*. That is, a relationship between the depth H1 of the first scores 101*a* and 102*a* and the depth H2 of the second scores 101*b* and 102*b* satisfies H1>H2. Thus, when the distance measurement sensor 51 measures a distance H+H1 obtained by adding the depth H1 to the distance H, it means that the first scores 101*a* and 102*a* (the depth H1) are measured. In addition, when the distance measurement sensor 51 measures a distance H+H2 obtained by adding the depth H2 to the distance H, it means that the second scores 101*b* and 102*b* (the depth H2) are measured.

Note that the distance measurement sensor 51 is preferably, for example, a laser displacement meter, but is not limited to the laser displacement meter and may be an ultrasonic sensor or the like. In addition, the measurement device is not limited to a non-contact sensor and may be a contact sensor.

The distance measurement sensor 51 is connected to the determination device 53. The distance measurement sensor 51 outputs the measurement result to the determination device 53.

The rotary encoder 52 functions as a position detector that detects a conveyance position of the corrugated cardboard sheet S. The rotary encoder 52 detects, for example, the number of rotations (rotational speed) and a rotational position of a rotary member in a drive device that conveys the corrugated cardboard sheet S along the conveying direction Y. The rotary encoder 52 is connected to the determination device 53. The rotary encoder 52 outputs the detection result to the determination device 53.

The determination device 53 compares the measured distance in a predetermined determination region that is preset from the front end toward the back end of the corrugated cardboard sheet S in the conveying direction Y with a threshold value that is preset to specify the magnitude relationship between the measured distance and the threshold value, determining the front/rear surface defect and the front/back side defect of the corrugated cardboard sheet S by the magnitude relationship.

The threshold value includes a first threshold value HA and a second threshold value HB. The first threshold value HA and the second threshold value HB are used to determine the distance H+H1 to the first scores 101*a* and 102*a* formed in the rear liner B (one surface) of the corrugated cardboard sheet S and the distance H+H2 to the second scores 101*b* and 102*b* formed in the front liner A (the other surface) of the corrugated cardboard sheet S. Here, the second threshold value HB is smaller than the first threshold value HA. That is, since the relationship between the depth H1 of the first scores 101*a* and 102*a* and the depth H2 of the second scores 101*b* and 102*b* satisfies H1>H2, the relationship between the first threshold value HA and the second threshold value HB satisfies HA>HB.

The determination device 53 compares the measured distance measured by the distance measurement sensor 51 with the first threshold value HA and the second threshold value HB to determine the front/rear surface defect and the front/back side defect of the corrugated cardboard sheet S. The details of this determination method will be described later.

Note that the determination device 53 is a control device, and the control device is a controller, which is implemented, for example, by using a central processing unit (CPU), a micro processing unit (MPU), or the like executing various types of programs stored in the storage unit by using a random access memory (RAM) as a work region.

The storage device 54 is connected to the determination device 53. The storage device 54 stores the first threshold value HA and the second threshold value HB. In addition, the storage device 54 stores the determination result of the determination device 53. The display device 55 is connected to the determination device 53. The display device 55 displays the determination result of the determination device 53. That is, when the corrugated cardboard sheet S is determined to be defective, the display device 55 displays which of the front/rear surface defect and the front/back side defect occurs.

Defect Detecting Method for Corrugated Cardboard Sheet

Figure 6:
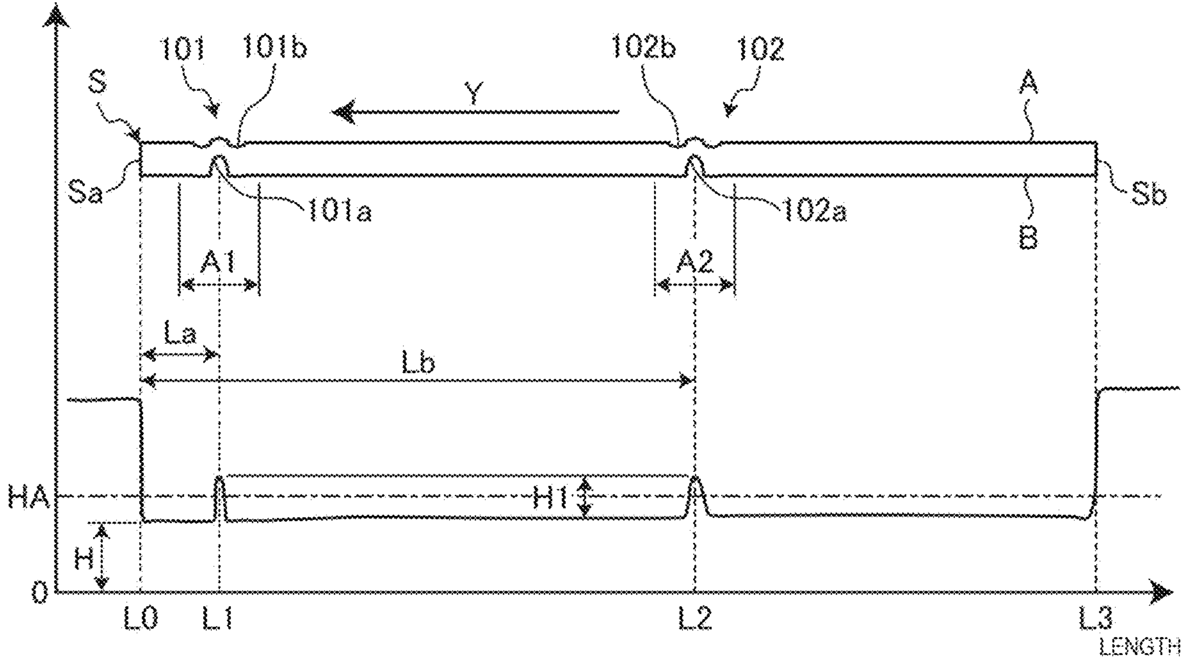
FIG. 6 is an explanatory diagram for describing a defect detecting method for a corrugated cardboard sheet.

FIG. 6 is an explanatory diagram for describing the defect detecting method for the corrugated cardboard sheet, and FIG. 7 is an explanatory diagram for describing the first threshold value and the second threshold value.

As illustrated in FIG. 6, the defect detecting method for the corrugated cardboard sheet according to the first embodiment includes measuring a distance to the front end of the corrugated cardboard sheet S and distances to the recessed portions of the first scores 101*a* and 12*a* or the second scores 101*b* and 102*b* to acquire a measured distance, comparing the measured distance with the first threshold value HA that is preset in predetermined determination regions A1 and A2 that are preset from the front end toward the back end of the corrugated cardboard sheet S, comparing the measured distance with the second threshold value HB smaller than the first threshold value HA in the determination regions A1 and A2, and specifying a magnitude relationship between the measured distance, and the first threshold value HA and the second threshold value HB and determining the front/rear surface defect and the front/back side defect of the corrugated cardboard sheet S.

To be specific, the distance measurement sensor 51 measures the distance to the corrugated cardboard sheet S, acquires at least the measured distance of the corrugated cardboard sheet S in the determination region A1 before and after the length La from the front end of the conveyed corrugated cardboard sheet S, and outputs the measured distance to the determination device 53. That is, the distance measurement sensor 51 acquires the measured distance regardless of the presence or absence of the corrugated cardboard sheet S in the conveying line of the box making machinery 30.

At this time, as illustrated in FIG. 6, when the corrugated cardboard sheet S is conveyed in a proper orientation along the conveying direction Y, the front end Sa is positioned downstream, the back end Sb is positioned upstream, the rear liner B is positioned on the lower surface side, and the front liner A is positioned on the upper surface side. The distance between the distance measurement sensor 51 and the corrugated cardboard sheet S indicates, for example, a value outside a measurement range until a length L0 at which the front end Sa of the corrugated cardboard sheet S reaches the measurement position of the distance measurement sensor 51. Moreover, when the front end Sa of the corrugated cardboard sheet S reaches the measurement position of the distance measurement sensor 51, the distance measurement sensor 51 measures the distance H (distance to be measured) at the front end Sa at the position of the length L0, measures the distance H+H1 (distance to be measured) of the first score 101*a* at the position of a length L1 from the front end Sa, measures the distance H+H1 (distance to be measured) of the first score 102*a* at the position of a length L2 from the front end Sa, and measures the distance H (distance to be measured) at the back end Sb at the position of a length L3. Then, the distance measurement sensor 51 outputs the measured distances acquired by the measurements to the determination device 53. The measured distances are input to the determination device 53 from the distance measurement sensor 51, and the conveyance position of the corrugated cardboard sheet S is input to the determination device 53 from the rotary encoder 52. That is, the determination device 53 acquires the measured distance at the position of the length L1 corresponding to the determination region A1, that is, the distance H+H1 of the first score 101*a*, and the measured distance at the position of the length L2 corresponding to the determination region A2, that is, the distance H+H1 of the first score 102*a*.

In this case, the determination region A1 has a length of a region obtained by adding predetermined margin values to the upstream side and the downstream side in the conveying direction Y with respect to the length La from the front end Sa of the corrugated cardboard sheet S. In addition, the determination region A2 has a length of a region obtained by adding predetermined margin values to the upstream side and the downstream side in the conveying direction Y with respect to the length Lb from the front end Sa of the corrugated cardboard sheet S. Note that the length La from the front end Sa to the first score 101*a* and the length Lb from the score Sa to the first score 102*a* can be grasped in advance by design values according to the specifications of the corrugated cardboard sheet S. Thus, the determination regions A1 and A2 can be preset before the measurement by the distance measurement sensor 51.

When the measured distance (here, the distance H+H1) in the determination regions A1 and A2 input from the distance measurement sensor 51 is smaller than the first threshold value HA and larger than the second threshold value HB, the determination device 53 determines that the corrugated cardboard sheet S has the front/rear surface defect. In addition, when the measured distance (here, the distance H+H1) in the determination regions A1 and A2 input from the distance measurement sensor 51 is smaller than the second threshold value HB, the determination device 53 determines that the corrugated cardboard sheet S has the front/back side defect.

As illustrated in FIG. 7, the first threshold value HA is set to a value obtained by adding a value Ha from 60% to 70% of the depth H1 that is the design value of the first scores 101*a* and 102*a* to the distance H from the distance measurement sensor 51 to the flat surface of the corrugated cardboard sheet S, that is, to the rear liner B without the first scores 101*a* and 102*a*. Further, the second threshold value HB is set to a value obtained by adding a value Hb from 20% to 30% of the depth H1 that is the design value of the first scores 101*a* and 102*a* to the distance H from the distance measurement sensor 51 to the flat surface of the corrugated cardboard sheet S, that is, to the rear liner B without the first scores 101*a* and 102*a*. Note that in this case, the depth of the design value can be grasped in advance from the specifications of the corrugated cardboard sheet S. Thus, the first threshold value HA and the second threshold value HB can be preset before the determination by the determination device 53.

That is, when the corrugated cardboard sheet S is conveyed along the conveying direction Y in a proper orientation, the measured distance H+H1 in the determination regions A1 and A2 is larger than the first threshold value HA, and thus, the determination device 53 determines that the corrugated cardboard sheet S is a good product without the front/rear surface defect or the front/back side defect.

Figure 8:
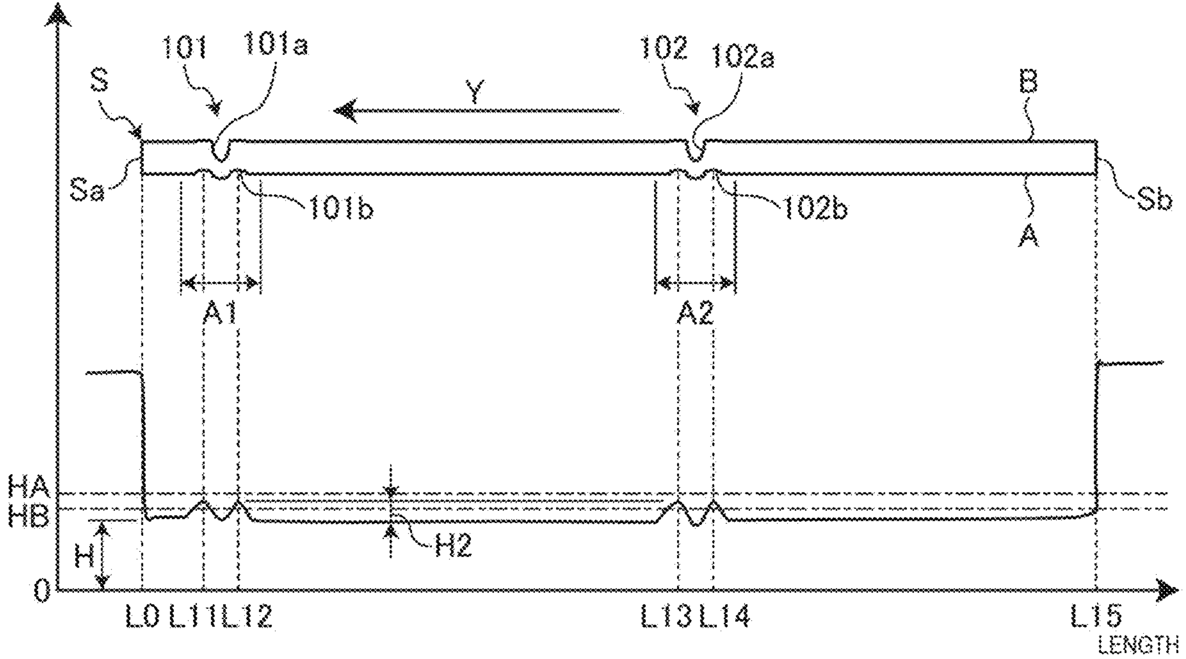
FIG. 8 is an explanatory diagram for describing a method for detecting a defective corrugated cardboard sheet whose front and rear surfaces are reversed.

FIG. 8 is an explanatory diagram for describing a method for detecting a defective corrugated cardboard sheet whose front and rear surfaces are reversed.

As illustrated in FIG. 8, when the corrugated cardboard sheet S is conveyed along the conveying direction Y with the front surface and the rear surface reversed, the front end Sa is positioned downstream and the back end Sb is positioned upstream, but the rear liner B is positioned on the upper surface side and the front liner A is positioned on the lower surface side. Then, the distance measurement sensor 51 measures the distance H (distance to be measured) at the front end Sa at the position of the length L0, measures the distance H+H2 (distance to be measured) of the second score 101*b* at the positions of lengths L11 and L12 from the front end Sa, measures the distance H+H2 (distance to be measured) of the second score 102*b* at the positions of lengths L13 and L14 from the front end Sa, and measures the distance H (distance to be measured) at the back end Sb at the position of a length L15. Then, the distance measurement sensor 51 outputs the measured distances at the positions of the lengths L11 and L12 corresponding to the determination region A1 acquired by the measurement, that is, the distance H+H2 of the second score 101*b* to the determination device 53, and outputs the measured distances at the positions of the lengths L13 and L14 corresponding to the determination region A2, that is, the distance H+H2 of the second score 102*b* to the determination device 53.

When the measured distance (here, the distance H+H2) in the determination regions A1 and A2 input from the distance measurement sensor 51 is smaller than the first threshold value HA and larger than the second threshold value HB, the determination device 53 determines that the corrugated cardboard sheet S has the front/rear surface defect. In addition, when the measured distance (here, the distance H+H2) in the determination regions A1 and H2 input from the distance measurement sensor 51 is smaller than the second threshold value HB, the determination device 53 determines that the corrugated cardboard sheet S has the front/back side defect.

That is, when the corrugated cardboard sheet S is conveyed along the conveying direction Y with the front surface and the rear surface reversed, the determination device 53 determines that the corrugated cardboard sheet S has the front/rear surface defect because the measured distance H+H2 in the determination regions A1 and A2 is smaller than the first threshold value HA and larger than the second threshold value HB.

Figure 9:
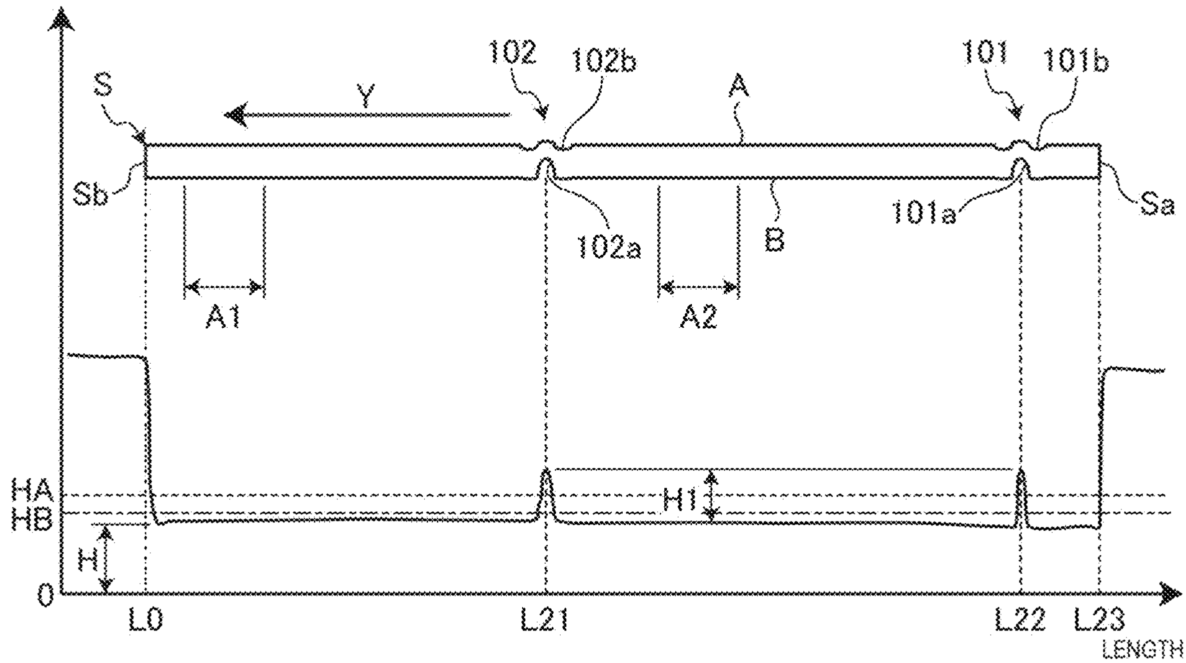
FIG. 9 is an explanatory diagram for describing a method for detecting a defective corrugated cardboard sheet whose front and back sides are reversed.

FIG. 9 is an explanatory diagram for describing a method for detecting a defective corrugated cardboard sheet whose front and back sides are reversed.

As illustrated in FIG. 9, when the corrugated cardboard sheet S is conveyed along the conveying direction Y with the front side and the back side reversed, the front end Sa is positioned upstream, the back end Sb is positioned downstream, the rear liner B is positioned on the lower surface side, and the front liner A is positioned on the upper surface side. Then, the distance measurement sensor 51 measures the distance H (distance to be measured) at the back end Sb at the position of the length L0, measures the distance H+H1 (distance to be measured) of the first score 102*a* at the position of a length L21 from the back end Sb, measures the distance H+H1 (distance to be measured) of the first score 101*a* at the position of a length L22 from the back end Sb, and measures the distance H (distance to be measured) at the front end Sa at the position of a length L23. Then, the distance measurement sensor 51 outputs the measured distance at the position corresponding to the determination region A1 acquired by the measurement, that is, the distance H of the corrugated cardboard sheet S to the determination device 53, and outputs the measured distance at the position corresponding to the determination region A2, that is, the distance H of the corrugated cardboard sheet S to the determination device 53.

When the measured distance (here, the distance H) in the determination regions A1 and A2 input from the distance measurement sensor 51 is smaller than the first threshold value HA and larger than the second threshold value HB, the determination device 53 determines that the corrugated cardboard sheet S has the front/rear surface defect. In addition, when the measured distance (here, the distance H) in the determination regions A1 and A2 input from the distance measurement sensor 51 is smaller than the second threshold value HB, the determination device 53 determines that the corrugated cardboard sheet S has the front/back side defect.

That is, when the corrugated cardboard sheet S is conveyed along the conveying direction Y with the front side and the back side reversed, the determination device 53 determines that the corrugated cardboard sheet S has the front/back side defect because the measured distance H in the determination regions A1 and A2 is smaller than the second threshold value HB.

Figure 10:
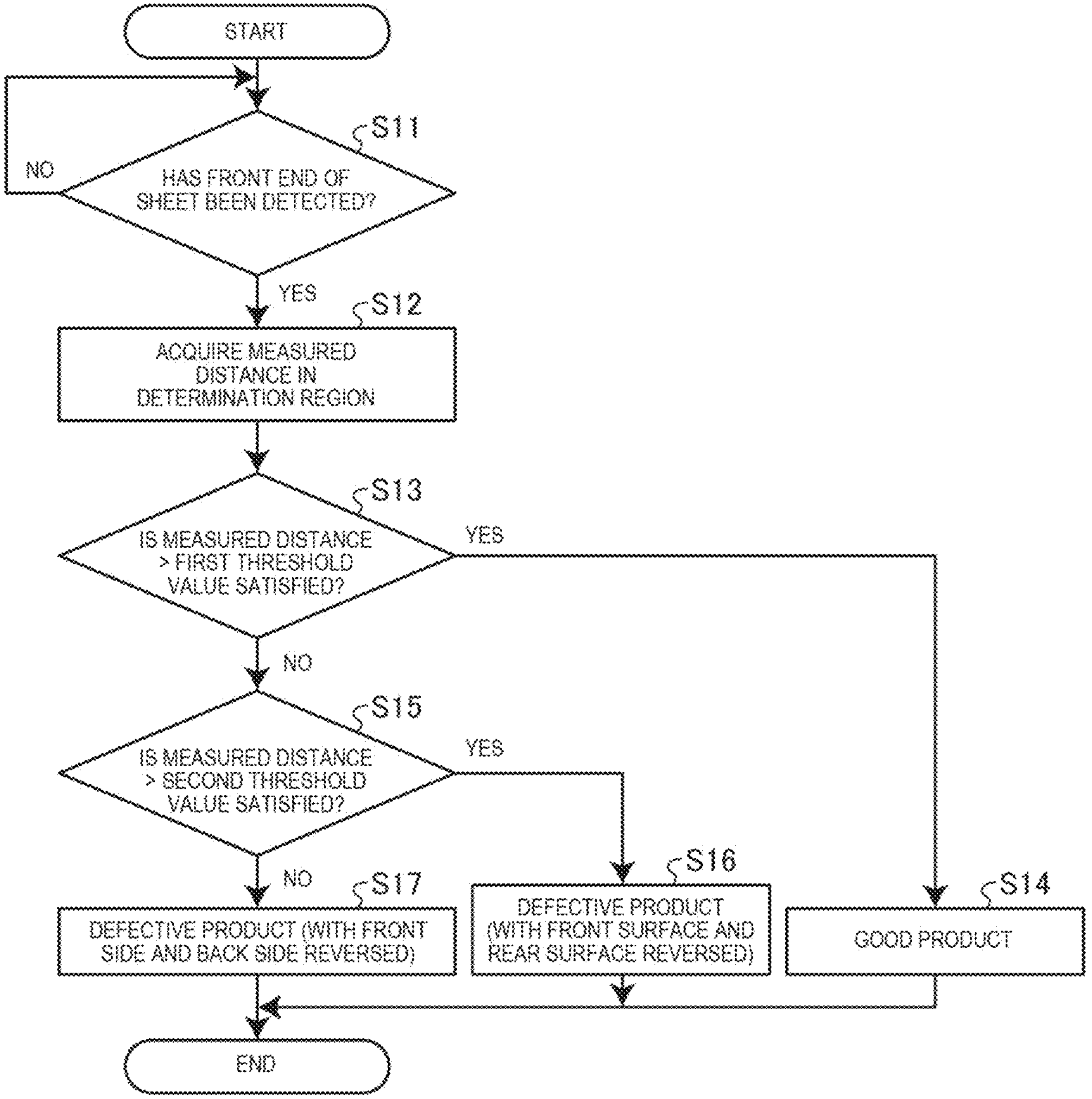
FIG. 10 is a flowchart illustrating determination control of a defect detecting method for a corrugated cardboard sheet.

FIG. 10 is a flowchart illustrating determination control of the defect detecting method for the corrugated cardboard sheet.

As illustrated in FIG. 5 and FIG. 10, in step S11, the determination device 53 determines whether or not the front end of the corrugated cardboard sheet S has been detected based on information input from the distance measurement sensor 51. Here, the front end of the corrugated cardboard sheet S is a front end positioned downstream, and is the front end Sa or the back end Sb. When it is determined that the front end of the corrugated cardboard sheet S has not been detected (NO), the determination device 53 continues to process step S11. On the other hand, when it is determined that the front end of the corrugated cardboard sheet S has been detected (YES), the determination device 53 proceeds to step S12.

In step S12, the determination device 53 acquires the measured distance of the corrugated cardboard sheet S in the determination regions A1 and A2 measured by the distance measurement sensor 51. In step S13, the determination device 53 determines whether or not the measured distance is larger than the first threshold value HA. When it is determined that the measured distance is larger than the first threshold value HA (YES), the determination device 53 determines that the corrugated cardboard sheet S is a good product in step S14.

On the other hand, when the determination device 53 determines that the measured distance is not larger than the first threshold value HA (NO), the processing proceeds to step S15. In step S15, the determination device 53 determines whether or not the measured distance is larger than the second threshold value HB. When it is determined that the measured distance is larger than the second threshold value HB (YES), the determination device 53 determines that the corrugated cardboard sheet S is a defective product and has the front/rear surface defect in step S16.

On the other hand, when it is determined that the measured distance is not larger than the second threshold value HB (NO), the determination device 53 determines that the corrugated cardboard sheet S is a defective product and has the front/back side defect in step S17.

Note that in the above description of the determination method, the two determination regions A1 and A2 are provided, and the measured distance measured in each of the determination regions A1 and A2 is compared with the first threshold value HA and the second threshold value HB to determine a defect. However, the measured distance may be compared with the first threshold value HA and the second threshold value HB in at least one two determination region A1 (A2) of the two determination regions A1 and A2 to determine a defect.

Second Embodiment

Figure 11:
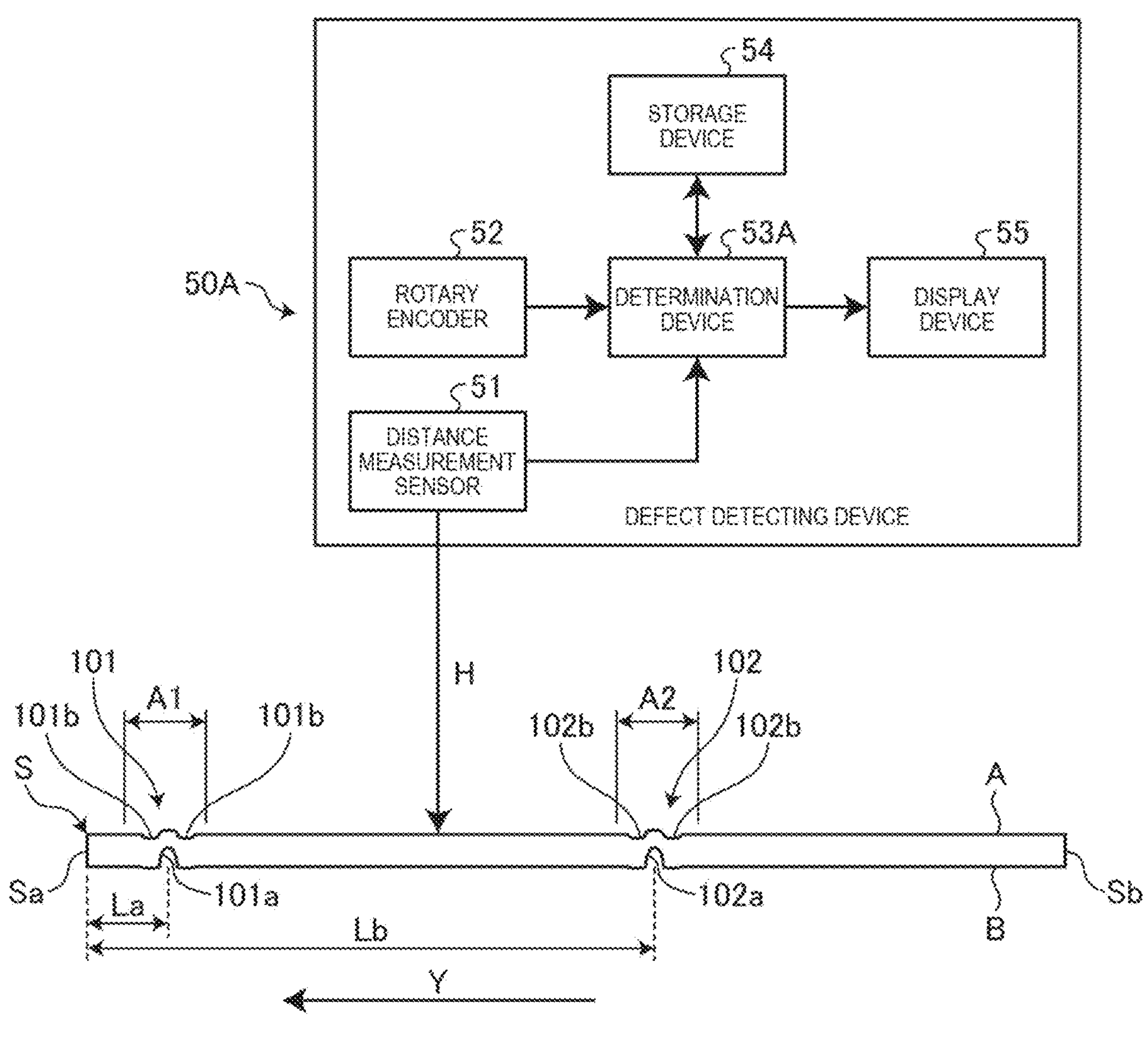
FIG. 11 is a schematic configuration diagram illustrating the defect detecting device for the corrugated cardboard sheet according to a second embodiment.

FIG. 11 is a schematic configuration diagram illustrating a defect detecting device for a corrugated cardboard sheet according to a second embodiment. Note that the same reference signs are given to members having the same functions as the embodiment described above and detailed description thereof will be omitted.

A defect detecting device 50A includes the distance measurement sensor (measurement device) 51, the rotary encoder 52, a determination device 53A, the storage device 54, and the display device 55. The distance measurement sensor 51, the rotary encoder 52, the storage device 54, and the display device 55 are similar to those in the first embodiment.

The distance measurement sensor 51 is disposed opposing the front liner A, which is the other surface of the corrugated cardboard sheet S to be conveyed, at a predetermined distance in the thickness direction of the corrugated cardboard sheet S. The distance measurement sensor 51 measures at least a distance to the front end on the upstream side of the corrugated cardboard sheet S and distances to the recessed portions of the scores 101 and 102 formed in the corrugated cardboard sheet S. A function of the distance measurement sensor 51 is similar to that of the first embodiment, but an arrangement position thereof is different from that of the first embodiment.

The determination device 53A determines a defect of the corrugated cardboard sheet S by comparing distances to the recessed portions of the scores 101 and 102 in a predetermined determination region preset from the front end toward the back end of the corrugated cardboard sheet S in the conveying direction Y with threshold values that are preset.

When the corrugated cardboard sheet S is conveyed in a proper orientation along the conveying direction Y, the front end Sa is positioned downstream, the back end Sb is positioned upstream, the rear liner B is positioned on the lower surface side, and the front liner A is positioned on the upper surface side. Then, the distance measurement sensor 51 measures the distance H (distance to be measured) at the front end Sa, measures the distance H+H2 (distance to be measured) of the second score 101*b* in the determination region A1, measures the distance H+H2 (distance to be measured) of the second score 102*b* in the determination region A2, and measures the distance H (distance to be measured) at the back end Sb. Then, the distance measurement sensor 51 outputs the measured distances acquired by the measurements to the determination device 53. The measured distances are input to the determination device 53 from the distance measurement sensor 51, and the conveyance position of the corrugated cardboard sheet S is input to the determination device 53 from the rotary encoder 52. That is, the determination device 53 acquires the measured distance at the position corresponding to the determination region A1, that is, the distance H+H2 of the second score 101*b*, and the measured distance at the position corresponding to the determination region A2, that is, the distance H+H2 of the second score 102*b*.

In this case, same as the first embodiment, the determination regions A1 and A2 have lengths of regions obtained by adding predetermined margin values to the upstream side and the downstream side in the conveying direction Y with respect to the lengths La and Lb. However, the determination regions A1 and A2 may have lengths of regions obtained by adding predetermined margin values to the upstream side and the downstream side in the conveying direction Y with respect to the lengths from the front end Sa of the corrugated cardboard sheet S to the second scores 101*b* and 102*b*.

When the measured distance (here, the distance H+H2) in the determination regions A1 and A2 input from the distance measurement sensor 51 is larger than the first threshold value HA, the determination device 53 determines that the corrugated cardboard sheet S has the front/rear surface defect. When the measured distance is smaller than the second threshold value HB, the determination device 53 determines that the corrugated cardboard sheet S has the front/back side defect.

Figure 12:
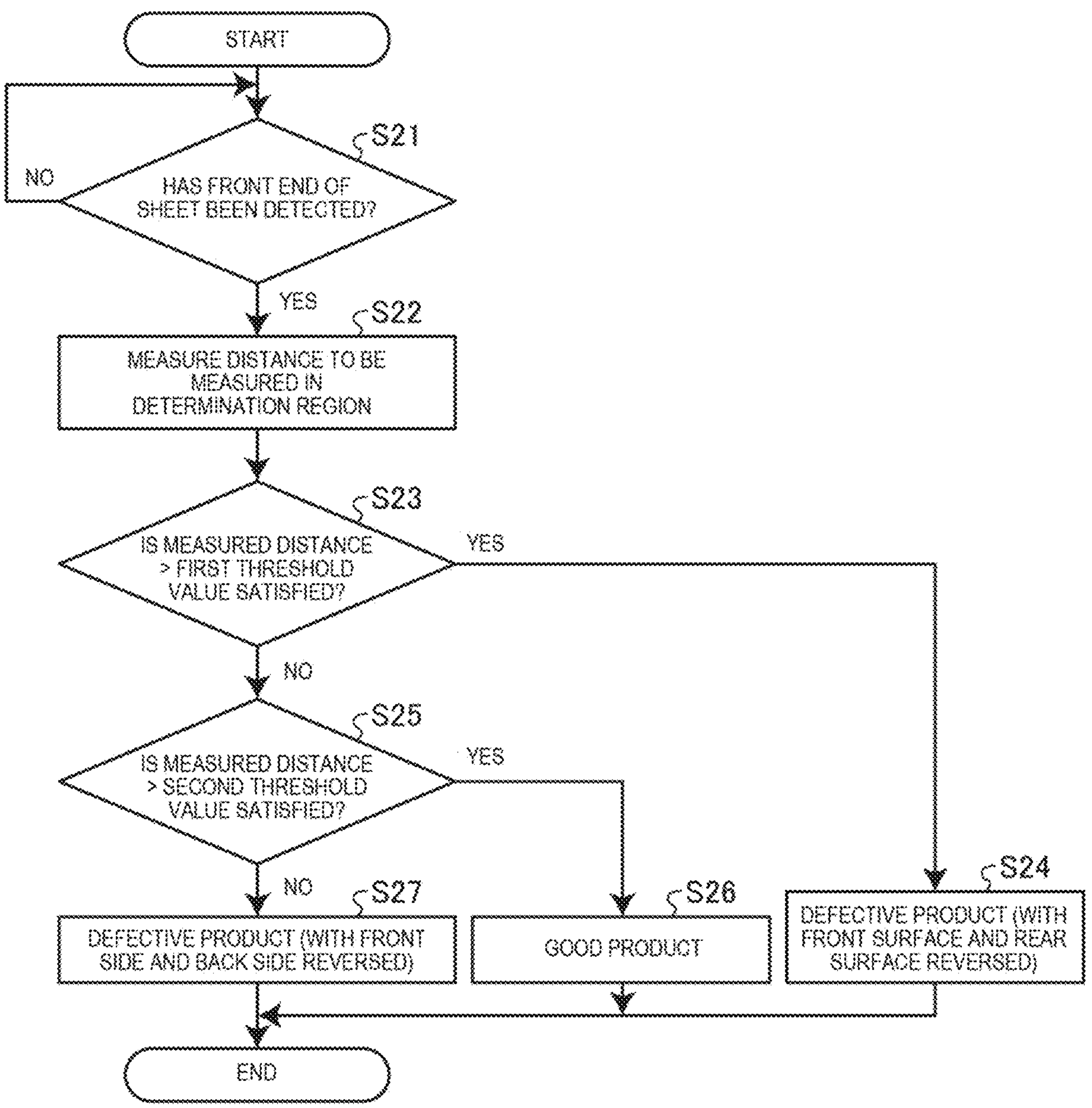
FIG. 12 is a flowchart illustrating determination control of the defect detecting method for the corrugated cardboard sheet.

FIG. 12 is a flowchart illustrating determination control of the defect detecting method for the corrugated cardboard sheet.

As illustrated in FIG. 11 and FIG. 12, in step S21, the determination device 53 determines whether or not the front end of the corrugated cardboard sheet S has been detected based on information input from the distance measurement sensor 51. When the determination device 53 determines that the front end of the corrugated cardboard sheet S has not been detected (NO), the determination device 53 continues to process step S21. On the other hand, when the determination device 53 determines that the front end of the corrugated cardboard sheet S has been detected (YES), the determination device 53 proceeds to step S22.

In step S22, the determination device 53 acquires the measured distance of the corrugated cardboard sheet S in the determination regions A1 and A2 measured by the distance measurement sensor 51. In step S23, the determination device 53 determines whether or not the measured distance is larger than the first threshold value HA. When the determination device 53 determines that the measured distance is larger than the first threshold value HA (YES), the determination device 53 determines that the corrugated cardboard sheet S is a defective product and has the front/rear surface defect in step S24.

On the other hand, when the determination device 53 determines that the measured distance is not larger than the first threshold value HA (NO), the process proceeds to step S25. In step S25, the determination device 53 determines whether or not the measured distance is larger than the second threshold value HB. When the determination device 53 determines that the measured distance is larger than the second threshold value HB (YES), the determination device 53 determines that the corrugated cardboard sheet S is a good product in step S26.

On the other hand, when the determination device 53 determines that the measured distance is not larger than the second threshold value HB (NO), the determination device 53 determines that the corrugated cardboard sheet S is a defective product and has the front/back side defect in step S27.

Actions and Effects of Present Embodiment

A defect detecting device for a corrugated cardboard sheet according to a first aspect includes the distance measurement sensor (measurement device) 51 disposed opposing one surface or another surface of the corrugated cardboard sheet S and being configured to measure a distance from an arrangement position to the front end of the corrugated cardboard sheet S and distances from the arrangement position to the recessed portions of the first scores 101*a* and 102*a* or the second scores 101*b* and 102*b* to acquire a measured distance, the storage device 54 configured to store the threshold values HA and HB that are preset, and the determination device 53 configured to perform comparison of the measured distance with the threshold values HA and HB in the determination regions A1 and A2 that are predetermined and preset from the front end toward the back end of the corrugated cardboard sheet S, the determination device being configured to specify a magnitude relationship between the measured distance and the threshold values HA and HB by the comparison, the determination device 53 being configured to determine the front/rear surface defect or the front/back side defect of the corrugated cardboard sheet S by using the magnitude relationship.

According to the defect detecting device for the corrugated cardboard sheet according to the first aspect, since the depth H1 of the recessed portions of the first scores 101*a* and 102*a* formed at one surface of the corrugated cardboard sheet S is different from the depth H2 of the recessed portions of the second scores 101*b* and 102*b* formed at the other surface of the corrugated cardboard sheet S, the front/rear surface defect or the front/back side defect can be determined by comparing the measured distance with the threshold values HA and HB. As a result, the defect of the corrugated cardboard sheet S in the conveying state can be appropriately detected.

When the corrugated cardboard boxes G are manufactured, the box making machinery 30 groups the corrugated cardboard boxes G into a predetermined number of batches and then discharges the grouped corrugated cardboard boxes G in a bundle. Then, an operator pulls out the defective corrugated cardboard box G from the discharged bundle. At this time, when the defect detecting device 50 can detect the front/rear surface defect and the front/back side defect in the corrugated cardboard sheet S as different defects, it becomes easy for the operator to pull out the defective corrugated cardboard box G (corrugated cardboard sheet S) from the bundle of the corrugated cardboard boxes G. That is, for the bundle of the corrugated cardboard boxes G, the corrugated cardboard box G having the front/back side defect has differences in the positions of the scores 101 and 102 in the conveying direction Y from those of the good product, and thus the operator can easily find the corrugated cardboard box G having the front/back side defect. On the other hand, for the bundle of the corrugated cardboard boxes G, since the corrugated cardboard box G having the front/rear surface defect has the same positions of the scores 101 and 102 in the conveying direction Y as those of the good product, it is difficult for the operator to find the corrugated cardboard box G having the front/rear surface defect. However, when the mixture of the front/back side defect and the front/rear surface defect is known to be in the bundle of the corrugated cardboard boxes G, the operator can easily find the corrugated cardboard box G having the front/back side defect or the front/rear surface defect. As a result, the operator can easily pull out the defective corrugated cardboard box G from the bundle of the corrugated cardboard boxes G, the operation time can be shortened, and the omission of pulling out the defective corrugated cardboard box G can be reduced.

A defect detecting device for a corrugated cardboard sheet according to a second aspect is the defect detecting device for the corrugated cardboard sheet according to the first aspect, in which the first threshold value HA and the second threshold value HB smaller than the first threshold value HA are provided, the determination device 53 performs comparison of the measured distance with the first threshold value HA and the second threshold value HB, specifies the magnitude relationship between the measured distance and the first threshold value HA and the second threshold value HB by the comparison, and determines the front/rear surface defect and the front/back side defect of the corrugated cardboard sheet S by using the magnitude relationship. Thus, comparing the measured distance that has been measured with the different threshold values HA and HB makes it possible to separately determine the front/rear surface defect and the front/back side defect.

A defect detecting device for a corrugated cardboard sheet according to a third aspect is the defect detecting device for the corrugated cardboard sheet according to the second aspect, in which the distance measurement sensor 51 is disposed opposing one surface of the corrugated cardboard sheet S, and the determination device 53 determines that the corrugated cardboard sheet has the front/rear surface defect when the measured distance is smaller than the first threshold value HA and larger than the second threshold value HB. Accordingly, when the distance measurement sensor 51 is disposed on one surface of the corrugated cardboard sheet S on which the first scores 101*a* and 102*a* are formed, the determination device 53 can easily determine whether the corrugated cardboard sheet S is a good product or a defective product having the front/rear surface defect by comparing the measured distance with the first threshold value HA and the second threshold value HB.

A defect detecting device for a corrugated cardboard sheet according to a fourth aspect is the defect detecting device for the corrugated cardboard sheet according to the third aspect, wherein the determination device 53 determines that the corrugated cardboard sheet S has the front/back side defect when the measured distance is smaller than the second threshold value HB. This allows the front/back side defect of the corrugated cardboard sheet S to be easily determined.

A defect detecting device for a corrugated cardboard sheet according to a fifth aspect is the defect detecting device for the corrugated cardboard sheet according to the second aspect, wherein the distance measurement sensor 51 is disposed opposing the other surface of the corrugated cardboard sheet S, and determines that the corrugated cardboard sheet has the front/rear surface defect when the measured distance is larger than the first threshold value HA. Accordingly, when the distance measurement sensor 51 is disposed on the other surface of the corrugated cardboard sheet S on which the second scores 101*b* and 102*b* are formed, the determination device 53 can easily determine whether the corrugated cardboard sheet S is a good product or a defective product having the front/rear surface defect by comparing the measured distance with the first threshold value HA.

A defect detecting device for a corrugated cardboard sheet according to a sixth aspect is the defect detecting device for the corrugated cardboard sheet according to the fifth aspect, wherein the determination device 53 determines that the corrugated cardboard sheet S has the front/back side defect when the measured distance is smaller than the second threshold value HB. As a result, it is possible to easily determine whether the corrugated cardboard sheet S is a good product or a defective product having the front/back side defect.

A defect detecting device for a corrugated cardboard sheet according to a seventh aspect is the defect detecting device for the corrugated cardboard sheet according to any one of the first to sixth aspects, wherein the measurement device is the distance measurement sensor 51 configured to be commonly used when the distance from the arrangement position to the front end of the corrugated cardboard sheet S and the distances from the arrangement position to the recessed portions of the first scores 101*a* and 102*a* or the recessed portions of the second scores 101*b* and 102*b* are measured. This makes it possible to simplify the device and to reduce the cost.

A defect detecting method for a corrugated cardboard sheet according to an eighth aspect includes measuring a distance from a predetermined position opposing one surface or the other surface of the corrugated cardboard sheet S to the front end of the corrugated cardboard sheet S and distances from the predetermined position to the recessed portions of the first scores 101*a* and 12*a* or the second scores 101*b* and 102*b* to acquire a measured distance, comparing the measured distance with the threshold values HA and HB that are preset in the determination regions A1 and A2 that are predetermined and preset from the front end to the back end of the corrugated cardboard sheet S, and specifying a magnitude relationship between the measured distance and the threshold values HA and HB and determining the front/rear surface defect or the front/back side defect of the corrugated cardboard sheet S by using the magnitude relationship. Thus, comparing the measured distance with the threshold values HA and HB makes it possible to determine the front/rear surface defect or the front/back side defect. As a result, the defect of the corrugated cardboard sheet S in the conveying state can be appropriately detected.

A defect detecting method for a corrugated cardboard sheet according to a ninth aspect is the defect detecting method for the corrugated cardboard sheet according to the eighth aspect, further including comparing the measured distance with the first threshold value HA in the determination regions A1 and A2, comparing the measured distance with the second threshold value HB smaller than the first threshold value HA in the determination regions A1 and A2, and specifying the magnitude relationship between the measured distance and the first threshold value HA and the second threshold value HB and determining the front/rear surface defect or the front/back side defect of the corrugated cardboard sheet S by using the magnitude relationship. Thus, comparing the measured distance with the different threshold values HA and HB allows the front/rear surface defect and the front/back side defect to be separately determined. As a result, the defect of the corrugated cardboard sheet S in the conveying state can be appropriately detected.

Box making machinery according to a tenth aspect includes the defect detecting device 50. Thus, comparing the measured distance with the threshold values HA and HB makes it possible to determine the front/rear surface defect or the front/back side defect. As a result, the defect of the corrugated cardboard sheet S in the conveying state can be appropriately detected. Then, an operation of pulling out the defective corrugated cardboard box G from a bundle of the corrugated cardboard boxes G discharged from the box making machinery 30 can be easily performed, an operation time can be shortened, and omission of the pulling out of the defective corrugated cardboard box G can be reduced.

Note that in the above description of the embodiments, the threshold values HA and HB are set by adding, to the distance H from the distance measurement sensor 51 to the flat surface of the corrugated cardboard sheet S, the values Ha and Hb obtained by considering the design values for the depths of the recessed portions of the scores 101*a*, 101*b*, 102*a*, and 102*b*, and the measured distance to the corrugated cardboard sheet S acquired by the distance measurement sensor 51 is compared with the threshold values HA and HB to determine a defect. However, no limitation is intended. For example, the threshold values HA and HB may be set to the values Ha and Hb obtained by considering the design values of the depths of the recessed portions of the scores 101*a*, 101*b*, 102*a*, and 102*b*, and a value obtained by subtracting the distance H from the measured distance to the corrugated cardboard sheet S acquired by the distance measurement sensor 51 may be compared with the values Ha and Hb as the threshold values to determine a defect.

In the above description of the embodiments, the corrugated cardboard sheet S is formed with the score 101 downstream in the conveying direction Y, and is formed with the score 102 upstream from the score 101 in the conveying direction Y, the two determination regions A1 and A2 are provided, and the measured distance measured in each of the determination regions A1 and A2 is compared with the first threshold value HA and the second threshold value HB to determine whether or not the corrugated cardboard sheet S is defective. However, no limitation is intended. The corrugated cardboard sheet S may have one, three, or four scores depending on the specifications. In this case, a determination region corresponding to each score may be provided, and a measured distance measured in each determination region may be compared with the first threshold value HA and the second threshold value HB to determine a defect. Further, in at least one of the determination regions, the measured distance may be compared with the first threshold value HA and the second threshold value HB to determine a defect.

Moreover, in the above description of the embodiments, the box making machinery 30 includes the feeding unit 31, the printing unit 32, the slotter and creaser unit 33, the die cutting unit 34, the folder gluer unit 35, and the counter ejector unit 36. However, no limitation is intended. The box making machinery 30 may include, for example, the feeding unit 31, the printing unit 32, and the slotter and creaser unit 33. In addition, the box making machinery 30 may include, for example, the feeding unit 31, the printing unit 32, the slotter and creaser unit 33, and the die cutting unit 34. Further, the box making machinery 30 may include, for example, the feeding unit 31, the printing unit 32, and the die cutting unit 34.

REFERENCE SIGNS LIST

10 Corrugating machine
11, 12, 15, 16, 19 Mill roll stand
13, 17 Single facer
14, 18 Bridge
20 Preheater
21 Glue machine
22 Double facer
23 Rotary shear
24 Slitter scorer
25 Cutoff
26 Defective product discharger
27 Stacker
30 Box making machinery
31 Feeding unit
32 Printing unit
33 Slotter and creaser unit
34 Die cutting unit
35 Folder gluer unit
36 Counter ejector unit
50, 50A Defect detecting device
51 Distance measurement sensor (measurement device)
52 Rotary encoder
53, 53A Determination device
54 Storage device
55 Display device
101 Score
101*a* First score
101*b* Second score
102 Score
102*a* First score
102*b* Second score
111 Cutting line
112, 113, 114, 115 Crease
121, 122, 123 Groove
124 Notch
131, 132, 133 Groove
134 Notch
A Front liner
B, B1, B2 Rear liner
C, C1, C2 Medium
D1, D2 Single-faced corrugated cardboard sheet
E, F Double wall corrugated cardboard sheet
G Corrugated cardboard box
S, S1 Corrugated cardboard sheet

The invention claimed is:

1. A defect detecting device for a corrugated cardboard sheet, the corrugated cardboard sheet including one surface formed with a recessed portion of a first score in a thickness direction and another surface formed with a recessed portion of a second score in the thickness direction, the recessed portion of the second score having a depth smaller than a depth of the recessed portion of the first score, the defect detecting device comprising:

a measurement device disposed opposing the one surface or the other surface and being configured to measure a distance from an arrangement position to a front end of the corrugated cardboard sheet and a distance from the arrangement position to the recessed portion of the first score or the recessed portion of the second score to acquire a measured distance; and a determination device configured to perform comparison of the measured distance with a threshold value that is preset in a determination region that is predetermined and preset from the front end toward a back end of the corrugated cardboard sheet, specify a magnitude relationship between the measured distance and the threshold value by the comparison, and determine a front/rear surface defect of the corrugated cardboard sheet or a front/back side defect of the corrugated cardboard sheet by using the magnitude relationship, wherein the threshold value is preset based on a distance from the arrangement position to a design value depth of the recessed portion of the first score according to specifications of the corrugated cardboard sheet, or a distance to a design value depth of the recessed portion of the second score according to the specifications of the corrugated cardboard sheet.

2. The defect detecting device for the corrugated cardboard sheet according to claim 1, wherein the threshold value includes a first threshold value and a second threshold value smaller than the first threshold value, and the determination device performs comparison of the measured distance with the first threshold value and the second threshold value, specifies a magnitude relationship between the measured distance and the first threshold value and the second threshold value by the comparison, and determines the front/rear surface defect and the front/back side defect of the corrugated cardboard sheet by using the magnitude relationship.

3. The defect detecting device for the corrugated cardboard sheet according to claim 2, wherein the measurement device is disposed opposing the one surface of the corrugated cardboard sheet, and the determination device determines that the corrugated cardboard sheet has the front/rear surface defect when the measured distance is smaller than the first threshold value and larger than the second threshold value.

4. The defect detecting device for the corrugated cardboard sheet according to claim 3, wherein the determination device determines that the corrugated cardboard sheet has the front/back side defect when the measured distance is smaller than the second threshold value.

5. The defect detecting device for the corrugated cardboard sheet according to claim 2, wherein the measurement device is disposed opposing the other surface of the corrugated cardboard sheet, and the determination device determines that the corrugated cardboard sheet has the front/rear surface defect when the measured distance is larger than the first threshold value.

6. The defect detecting device for the corrugated cardboard sheet according to claim 5, wherein the determination device determines that the corrugated cardboard sheet has the front/back side defect when the measured distance is smaller than the second threshold value.

7. The defect detecting device for the corrugated cardboard sheet according to claim 1, wherein the measurement device is a distance measurement sensor configured to be commonly used when the distance from the arrangement position to the front end of the corrugated cardboard sheet and the distance from the arrangement position to the recessed portion of the first score or the recessed portion of the second score are measured.

8. Box making machinery comprising:

the defect detecting device for the corrugated cardboard sheet according to claim 1.

9. A defect detecting method for a corrugated cardboard sheet, the corrugated cardboard sheet including one surface formed with a recessed portion of a first score in a thickness direction and another surface formed with a recessed portion of a second score in the thickness direction, the recessed portion of the second score having a depth smaller than a depth of the recessed portion of the first score, the defect detecting method comprising:

measuring a distance from a predetermined position opposing the one surface or the other surface to a front end of the corrugated cardboard sheet and a distance from the predetermined position to the recessed portion of the first score or the recessed portion of the second score to acquire a measured distance;

comparing the measured distance with a threshold value that is preset in a determination region that is predetermined and preset from the front end toward a back end of the corrugated cardboard sheet; and specifying a magnitude relationship between the measured distance and the threshold value and determining a front/rear surface defect of the corrugated cardboard sheet or a front/back side defect of the corrugated cardboard sheet by using the magnitude relationship, wherein the threshold value is preset based on a distance from the predetermined position to a design value depth of the recessed portion of the first score according to specifications of the corrugated cardboard sheet, or a distance to a design value depth of the recessed portion of the second score according to the specifications of the corrugated cardboard sheet.

10. The defect detecting method for the corrugated cardboard sheet according to claim 9, further comprising:

comparing the measured distance with a first threshold value in the determination region;

comparing the measured distance with a second threshold value smaller than the first threshold value in the determination region; and specifying a magnitude relationship between the measured distance and each of the first threshold value and the second threshold value, and determining the front/rear surface defect and the front/back side defect of the corrugated cardboard sheet by using the magnitude relationship.

* * * * *